(12) United States Patent
Nakamura et al.

(10) Patent No.: US 8,609,768 B2
(45) Date of Patent: Dec. 17, 2013

(54) HOT MELT ADHESIVE COMPOSITION

(75) Inventors: Makito Nakamura, Tokyo (JP); Genichirou Enna, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/357,144

(22) Filed: Jan. 24, 2012

(65) Prior Publication Data

US 2012/0123043 A1 May 17, 2012

Related U.S. Application Data

(63) Continuation of application No. PCT/JP2010/064522, filed on Aug. 26, 2010.

(30) Foreign Application Priority Data

Aug. 27, 2009 (JP) ................................. 2009-196846

(51) Int. Cl.
- C08L 75/06 (2006.01)
- C08L 75/08 (2006.01)
- C08G 65/40 (2006.01)

(52) U.S. Cl.
USPC ............ 525/127; 525/455; 525/456; 525/534

(58) Field of Classification Search
USPC .................................. 525/127, 455, 456, 534
See application file for complete search history.

(56) References Cited

U.S. PATENT DOCUMENTS

| | | | | |
|---|---|---|---|---|
| 4,880,487 A | * | 11/1989 | Sheehan et al. ............... | 156/327 |
| 4,948,513 A | * | 8/1990 | Mitchell ........................ | 210/705 |
| 5,554,719 A | * | 9/1996 | Sounik ........................... | 528/212 |
| 5,565,544 A | * | 10/1996 | Sounik ........................... | 528/86 |
| 6,086,991 A | * | 7/2000 | Hubbard et al. ............... | 428/336 |
| 6,180,244 B1 | * | 1/2001 | Rayner et al. ................ | 428/424.8 |
| 6,406,788 B1 | * | 6/2002 | Doi et al. ...................... | 428/364 |
| 2005/0107603 A1 | * | 5/2005 | Peltonen et al. ............... | 536/110 |
| 2007/0088111 A1 | * | 4/2007 | Maksimovic et al. ......... | 524/401 |
| 2010/0247434 A1 | * | 9/2010 | Greenway et al. ............ | 424/1.69 |

FOREIGN PATENT DOCUMENTS

| | | |
|---|---|---|
| JP | 09-221640 | 8/1997 |
| JP | 10-279913 | 10/1998 |
| JP | 2000-336142 | 12/2000 |
| JP | 2001-031942 | 2/2001 |
| JP | 2004-323660 | 11/2004 |

OTHER PUBLICATIONS

Machine translation of JP 2001-031942.*
Machine translation of JP 2000-336142.*
Machine Tranlsation of Iida et al (JP 10-279913).*
U.S. Appl. No. 13/419,912, filed Mar. 14, 2012, Nakamura, et al.
International Search Report issued Oct. 26, 2010 in PCT/JP2010/064522 filed Aug. 26, 2010.

* cited by examiner

*Primary Examiner* — Mike M Dollinger
(74) *Attorney, Agent, or Firm* — Oblon, Spivak, McClelland, Maier & Neustadt, L.L.P.

(57) ABSTRACT

A hot melt adhesive composition employing a thermoplastic polyurethane, which has a high adhesive strength even under bonding conditions of low temperature and short time or even to nylon cloth, and which has a favorable adhesive strength in a wide temperature range of from room temperature to low temperature. A hot melt adhesive composition comprising a thermoplastic polyurethane (A) having a flow initiation temperature of from 80 to 150° C. and a phenolic hydroxy group-containing compound (B) having phenolic hydroxy groups and having a molecular weight of at least 1,000.

14 Claims, No Drawings

HOT MELT ADHESIVE COMPOSITION

TECHNICAL FIELD

The present invention relates to a hot melt adhesive composition.

BACKGROUND ART

Heretofore, a hot melt adhesive composition employing a thermoplastic polyurethane has been known. A thermoplastic polyurethane has mechanical properties preferred as a hot melt adhesive particularly for clothing, since its elongation at break is large, and its modulus is low, whereby the drape is good.

The following Patent Document 1 discloses a thermoplastic polyurethane which is a polyurethane obtained by a reaction of a polymer diol, a diisocyanate compound and a chain extender, which can be melted at a low temperature of from 80 to 150° C. by using a specific low molecular weight diol as a part of the chain extender, and an adhesive using it.

PRIOR ART DOCUMENT

Patent Document

Patent Document 1: JP-A-2000-336142

DISCLOSURE OF INVENTION

Technical Problem

However, if a thermoplastic polyurethane is used as an adhesive for clothing, no sufficient adhesive strength is obtained in some cases depending on the material of cloth.

Particularly for nylon cloth, heretofore, wettability of the thermoplastic polyurethane to the nylon cloth is poor, and it is difficult to achieve a favorable adhesive strength. Further, as the nylon cloth has a relatively low heat distortion temperature, adhesion to the nylon cloth must be carried out at a heating temperature of at most 180° C., and restrictions as to the bonding conditions are severe such that the nylon cloth cannot be heated long, and it is required to achieve a high adhesive strength under such restrictions.

On the other hand, clothing such as mountaineering wear and ski wear is used in a wide temperature range of from room temperature to a low temperature of 0° C. or below, and accordingly an adhesive to be used for such clothing is required not only to be excellent in the adhesive strength at room temperature but also to maintain a high adhesive strength even at low temperature. However, a conventional thermoplastic polyurethane does not necessarily have a sufficient adhesive strength in a wide temperature range.

Under these circumstances, it is an object of the present invention to provide a hot melt adhesive composition employing a thermoplastic polyurethane, which has a high adhesive strength even under bonding conditions of low temperature and short time or even to nylon cloth to which bonding is difficult, and which has a favorable adhesive strength in a wide temperature range of from room temperature to low temperature.

Solution to Problem

To achieve the above object, the hot melt adhesive composition of the present invention comprises a thermoplastic polyurethane (A) having a flow initiation temperature of from 80 to 150° C. and a phenolic hydroxy group-containing compound (B) having phenolic hydroxy groups and having a molecular weight of at least 1,000.

The above hot melt adhesive composition of the present invention preferably contains 100 parts by mass of the thermoplastic polyurethane (A) and from 1 to 100 parts by mass of the phenolic hydroxy group-containing compound (B). It more preferably contains from 1 to 50 parts by mass of the phenolic hydroxy group-containing compound (B).

Further, it is preferred that the mass average molecular weight (Mw) of the thermoplastic polyurethane (A) is from 40,000 to 150,000. Further, it is preferred that the glass transition temperature is from −40 to 0° C.

The thermoplastic polyurethane (A) is more preferably a hydroxy group-terminated polyurethane.

It is preferred that the thermoplastic polyurethane (A) has structural units derived from at least one polyol compound selected from the group consisting of a polyester polyol, a polyether polyol and a polyester ether polyol, structural units derived from at least one chain extender, and structural units derived from at least one polyisocyanate compound. It is more preferred that the polyol compound is a diol compound having a hydroxy value (OHV) of from 22 to 230, the chain extender is a dihydric alcohol having a molecular weight of at most 300, and the polyisocyanate compound is a diisocyanate compound.

It is more preferred that the thermoplastic polyurethane (A) is a hydroxy group-terminated polyurethane obtained by reacting the diol compound having a hydroxy value (OHV) of from 22 to 230, the dihydric alcohol having a molecular weight of at most 300 and the diisocyanate compound in a ratio such that the isocyanate index becomes from 0.92 to 0.98.

It is preferred that the phenolic hydroxy group-containing compound (B) is at least one member selected from the group consisting of a phenolic resin obtained by a reaction of a phenol with an aldehyde; a polymer of a monomer having an ethylenic double bond and having a phenolic hydroxy group in its side chain; a copolymer of a monomer having an ethylenic double bond and having a phenolic hydroxy group in its side chain with a monomer having an ethylenic double bond and having no phenolic hydroxy group; and tannin, and in the copolymer, the proportion of the structural units having a phenolic hydroxy group is at least 75 mol % based on all the structural units of the copolymer.

Further, it is preferred that the phenolic hydroxy group-containing compound (B) is a phenolic resin having a mass average molecular weight (Mw) of from 1,000 to 15,000; a homopolymer of vinylphenol or copolymer of vinylphenol with a monomer having no phenolic hydroxy group, having a mass average molecular weight (Mw) of from 1,000 to 40,000; or hydrolyzable tannin or condensed tannin, having a molecular weight of at least 1,000.

The hot melt adhesive composition of the present invention can be preferably used as an adhesive for clothing.

Advantageous Effects of Invention

The hot melt adhesive composition of the present invention is an adhesive composition employing a thermoplastic polyurethane, and has a favorable adhesive strength in a wide temperature range of from room temperature to low temperature and has a high adhesive strength even under bonding conditions of low temperature and short time or even to nylon cloth.

DESCRIPTION OF EMBODIMENTS

In this specification, the number average molecular weight (Mn) and the mass average molecular weight (Mw) are molecular weights as calculated as polystyrene obtained by measurement by gel permeation chromatography employing a calibration curve prepared by using a standard polystyrene test sample having a known molecular weight. Further, the molecular weight distribution (Mw/Mn) is a value obtained by dividing the mass average molecular weight (Mw) by the number average molecular weight (Mn).

The hot melt adhesive composition of the present invention comprises a thermoplastic polyurethane (A) and a phenolic hydroxy group-containing compound (B).

<Thermoplastic Polyurethane (A)>

The thermoplastic polyurethane in the present invention is a thermoplastic polyurethane (A) having a flow initiation temperature of from 80 to 150° C.

The flow initiation temperature is a flow initiation temperature measured by using a Koka-type flow tester under measurement conditions of a die diameter of 1 mm, a doe length of 10 mm, a load of 30 kg, preheating of 5 minutes, a temperature raise starting temperature of 80° C. and a heating rate of 3° C./min, as described in the after-mentioned Examples. Under such measurement conditions, the procedure of the thermoplastic polyurethane from solid to the flow region via the rubber-like elastic region, is continuously measured, and the temperature at which the thermoplastic polyurethane starts flowing out of the die is the flow initiation temperature.

The thermoplastic polyurethane (A) having such a flow initiation temperature being relatively low in the present invention can be obtained by adjusting the type and the reaction ratio of the polyurethane starting material. Particularly, it can be obtained by adjusting the reaction ratio of isocyanate groups and active hydrogen-containing groups to obtain a polyurethane having a relatively low molecular weight. A polyurethane having a relatively low molecular weight usually has distinct terminal groups. Each terminal group is derived from the functional group of the starting material of the polyurethane, and is derived from, for example, a hydroxy group of a polyol compound, a hydroxy group or an amino group of a chain extender, or an isocyanate group of a polyisocyanate compound. A highly reactive terminal group among such terminal groups of the polyurethane may change after formation of the polyurethane. For example, an isocyanate group is reacted with moisture and is converted to an amino group or the like. On the other hand, a hydroxy group is relatively stable. The thermoplastic polyurethane (A) in the present invention is usually a polyurethane having terminal groups regardless of the type of the terminal groups and their change.

The thermoplastic polyurethane (A) in the present invention is preferably one obtained by a reaction of a polyol compound, a polyisocyanate compound and a chain extender. That is, it is preferably a thermoplastic polyurethane having structural units derived from at least one polyol compound, structural units derived from at least one chain extender, and structural units derived from at least one polyisocyanate compound.

Further, the thermoplastic polyurethane (A) in the present invention is preferably a polyurethane (hereinafter referred to as a hydroxy group-terminated polyurethane) having hydroxy groups as its terminal groups. The hydroxy group-terminated polyurethane is obtained by reacting a polyol compound and a polyisocyanate compound and preferably further a hydroxy group-containing chain extender in a ratio such that the hydroxy groups are in excess of the isocyanate groups. The hydroxy group-terminated polyurethane is preferably such that 95 mol % or higher of the terminal groups are hydroxy groups, more preferably 98 mol % or higher.

Further, the thermoplastic polyurethane (A) in the present invention is a polyurethane obtained by reacting a bifunctional starting material so that it has thermoplasticity. That is, it is preferably a linear polymer obtained by using as starting materials a bifunctional polyol compound (i.e. a diol compound), a bifunctional polyisocyanate compound (i.e. a diisocyanate compound), a chain extender, and the like. It may be a polymer having a small amount of branched structures, obtained by using a small amount of a trifunctional or higher starting material in combination as a part of the starting materials, but presence of branched structures to such an extent that the thermoplasticity is lowered is unfavorable. Use of a starting material having a functional group with low reactivity, which does not substantially contribute to the polyurethane formation reaction, is not limited so long as it is bifunctional excluding the low reactive functional group.

Further, a monofunctional compound may be used as a starting material within a range not to impair the physical properties of the thermoplastic polyurethane (A). For example, a monofunctional active hydrogen compound such as a monool or a monoisocyanate compound may be used. Usually, the residue of the monofunctional compound becomes a terminal group. For example, a monofunctional active hydrogen compound is reacted with an isocyanate-terminated polyurethane to obtain a thermoplastic polyurethane (A) the terminal groups of which are the residue of the monofunctional active hydrogen compound.

[Polyol Compound]

The polyol compound to be used for preparation of the thermoplastic polyurethane (A) is preferably at least one member selected from the group consisting of a polyester polyol, a polyether polyol, polybutadiene polyol, a polycarbonate polyol and a polyester ether polyol. Such a polyol compound is preferably a diol compound, whereby a polyurethane having thermoplasticity is likely to be obtained. Further, the polyol compound is a compound having a high molecular weight as compared with the chain extender (i.e. a compound having a relatively low hydroxy value (OHV)).

The hydroxy value (OHV) of the polyol compound is preferably from 10 to 450, more preferably from 22 to 230. When the hydroxy value is at least 10, a highly cohesive hot melt adhesive composition can be obtained, and when it is at most 450, a hot melt adhesive composition excellent in the flexibility at room temperature and at low temperature can be obtained.

[Polyester Polyol]

The polyester polyol to be used for preparation of the thermoplastic polyurethane (A) is preferably a polyester polyol obtained by subjecting a polyhydric alcohol and a polyvalent carboxylic acid to condensation reaction, or a polyester polyol obtained by subjecting a cyclic ester (a lactone) to ring-opening addition reaction to a polyhydric alcohol as an initiator.

As the thermoplastic polyurethane (A) is required to have thermoplasticity, it is preferred to use a dihydric alcohol (diol) as the polyhydric alcohol. A trihydric or higher alcohol may be used in combination within a range where the thermoplastic polyurethane (A) has thermoplasticity.

The dihydric alcohol (diol) may, for example, be ethylene glycol, diethylene glycol, propylene glycol, dipropylene glycol, 1,3-propanediol, 1,2-propanediol, 1,4-butanediol, neopentyl glycol, 1,5-pentanediol, 3-methyl-1,5-pentanediol, 1,6-hexanediol, 1,9-nonanediol, 2-methyl-1,8-octanediol, cyclohexanediol or dichlorohexanedimethanol. They may be used alone or in combination of two or more.

It is preferred to use, as the polyvalent carboxylic acid, a bivalent carboxylic acid (dicarboxylic acid), whereby a polyurethane having thermoplasticity is likely to be obtained. A trivalent or higher carboxylic acid may be used in combination within a range where the thermoplastic polyurethane (A) has thermoplasticity.

The dicarboxylic acid is preferably an aliphatic dicarboxylic acid such as succinic acid, glutaric acid, adipic acid, pimelic acid, suberic acid, azelaic acid, sebacic acid, decamethylenedicarboxylic acid or dodecamethylenedicarboxylic acid. Further, an aromatic dicarboxylic acid such as terephthalic acid, isophthalic acid, 1,5-naphthalic acid or 2,6-naphthalic acid may also be used. An acid anhydride thereof may also be used. They may be used alone or in combination of two or more.

When the thermoplastic polyurethane (A) has an aromatic ring, favorable affinity with the phenolic hydroxy group-containing compound (B) is likely to be obtained. On the other hand, if the number of aromatic rings present in the thermoplastic polyurethane (A) is large, the hot melt adhesive composition tends to be hard, and the adhesive strength may be decreased. Accordingly, in a case where the aromatic dicarboxylic acid is used as the dicarboxylic acid, it is preferably used in combination with the aliphatic dicarboxylic acid.

The cyclic ester (lactone) may, for example, be ε-caprolactone, γ-valerolactone, δ-valerolactone, β-methyl-δ-valerolactone or butyrolactone. They may be used alone or in combination of two or more. ε-caprolactone is particularly preferred.

The polyester polyol to be used in the present invention is preferably a polyester diol, more preferably a polyester diol obtained by subjecting a $C_{2-12}$ alkylene diol and an aliphatic dicarboxylic acid to condensation reaction. For example, polybutylene adipate, polybutylene ethylene adipate or polyhexene adipate is suitable.

The polyester polyol may have a carboxylic acid type terminal structure, but it is preferred that most of terminal functional groups are hydroxy groups. Specifically, the acid value of the polyester polyol is preferably at most 2 mgKOH/g.

[Polyether Polyol]

The polyether polyol to be used for preparation of the thermoplastic polyurethane (A) is preferably a polyol or a polyoxytetramethylene polyol obtained by ring-opening addition polymerization of an alkylene oxide to a polyhydric alcohol as the initiator.

Preferred is a diol obtained by ring-opening addition polymerization of an alkylene oxide to a dihydric alcohol; or polyoxytetramethylene glycol, whereby a polyurethane having thermoplasticity is likely to be obtained.

The dihydric alcohol may, for example, be ethylene glycol, diethylene glycol, polyethylene glycol, propylene glycol, dipropylene glycol or 1,4-butanediol.

The alkylene oxide is preferably a $C_{2-4}$ alkylene oxide, and may, for example, be ethylene oxide, propylene oxide, 1,2-butylene oxide or 2,3-butylene oxide.

Particularly, in view of high glass transition temperature and crystallinity, a polyoxytetramethylene polyol is preferred, and polyoxytetramethylene glycol is more preferred.

The polyoxytetramethylene polyol may, for example, be a polyol obtained by ring-opening polymerization of tetrahydrofuran (THF) using a catalyst selected from the group consisting of zeolite, metalloaluminosilicate, a super strong acid such as fluorosulfonic acid, a mixture of an acid with acetic anhydride, a perfluorosulfonic acid resin, bleaching earth, a heteropolyacid having water of crystallization controlled within a specific range, and the like.

[Polyester Ether Polyol]

The polyester ether polyol to be used for preparation of the thermoplastic polyurethane (A) is one obtained by addition polymerization of a dicarboxylic anhydride and/or a lactone monomer and an alkylene oxide to the above polyether polyol or polyester polyol as the initiator using a double metal cyanide complex catalyst (hereinafter sometimes referred to as DMC catalyst), or one obtained by addition polymerization of an alkylene oxide to a polyester diol as the initiator using a DMC catalyst.

The above polyether polyol and polyester polyol as the initiator are preferably a diol, whereby a polyurethane having thermoplasticity is likely to be obtained. Further, preferred is a polyester ether diol using a polyether diol as the initiator, whereby a thermoplastic polyurethane excellent in the flexibility is likely to be obtained.

The dicarboxylic acid anhydride may, for example, be phthalic anhydride, maleic anhydride or succinic anhydride. Among them, phthalic anhydride is preferred, because phthalic anhydride which is an aromatic dicarboxylic anhydride has extremely high cohesive force and polarity, and greatly contributes to the adhesion to various adherends.

The lactone monomer may, for example, be ε-caprolactone, γ-valerolactone, δ-valerolactone, β-methyl-δ-valerolactone or butyrolactone, and is particularly preferably ε-caprolactone.

The alkylene oxide is preferably a $C_{2-4}$ alkylene oxide, such as propylene oxide, 1,2-butylene oxide, 2,3-butylene oxide or ethylene oxide. The alkylene oxides may be used alone or in combination of two or more. As the alkylene oxide (c), it is preferred to use ethylene oxide or propylene oxide, and it is more preferred to use propylene oxide alone.

The proportion of the structural units derived from the initiator is preferably from 1 to 60 mass %, more preferably from 10 to 60 mass % based on all the structural units of the polyester ether polyol. When the content of the structural units derived from the initiator is at least 1 mass %, a desired polyester ether polyol is likely to be obtained.

[Chain Extender]

The chain extender is a bifunctional compound having two functional groups reactive with an isocyanate group, and is preferably one having a molecular weight of at most 500, more preferably at most 300. The functional group is preferably a hydroxy group, or a primary or secondary amino group. When used for preparation of a hydroxy group-terminated polyurethane, it is preferred to use a dihydric alcohol as the chain extender.

The chain extender may, for example, be a dihydric alcohol such as ethylene glycol, propylene glycol, 1,4-butanediol, 1,5-pentanediol or 1,6-hexanediol; an amino alcohol such as ethanolamine, aminopropyl alcohol, 3-aminocyclohexyl alcohol or p-aminobenzyl alcohol; a diamine such as ethylenediamine, 1,2-propylenediamine, 1,4-butylenediamine, 2,3-butylenediamine, hexamethylenediamine, cyclohexanediamine, piperazine, xylylenediamine, tolylenediamine, phenylenediamine, diphenylmethanediamine or 3,3'-dichlorodiphenylmethanediamine; a hydrazine such as hydrazine, monoalkylhydrazine or 1,4-dihydrazinodiethylene; or a dihydrazide such as carbohydrazide or hydrazide adipate. They may have a substituent.

Such chain extenders may be used alone or in combination of two or more.

The chain extender is more preferably a dihydric alcohol, particularly preferably 1,4-butanediol, 1,5-pentanediol, 1,6-hexanediol or 3-methyl-1,5-pentanediol.

[Polyisocyanate Compound]

The polyisocyanate compound to be used for preparation of the thermoplastic polyurethane (A) is preferably a diisocyanate compound, whereby a polyurethane having thermoplasticity is likely to be obtained. It may, for example, be an aromatic diisocyanate compound such as 4,4'-diphenylmethane diisocyanate, 2,4'-diphenylmethane diisocyanate, naphthalene-1,5-diisocyanate, 2,4-tolyelen diisocyanate or 2,6-tolyene diisocyanate; an aralkyl diisocyanate compound such as xylylene diisocyanate or tetramethylxylylene diisocyanate; an aliphatic diisocyanate compound such as hexamethylene diisocyanate; an alicyclic diisocyanate compound such as isophorone diisocyanate or 4,4'-methylenebis(cyclohexyl isocyanate); or an urethane modified product, a biuret modified product, an allophanate modified product, a carbodiimide modified product or an isocyanurate modified product, obtainable from such a diisocyanate compound. It is preferably an aromatic diisocyanate, particularly preferably diphenylmethane diisocyanate, in view of excellent reactivity with the polyol compound, with a view to obtaining favorable affinity with the phenolic hydroxy group-containing compound (B), and with a view to improving the adhesion of the thermoplastic polyurethane (A).

[Process for Producing Thermoplastic Polyurethane (A)]

The thermoplastic polyurethane (A) is obtained by a conventional process for producing a urethane elastomer by e.g. a one shot method or a prepolymer method, and a prepolymer method is preferred to obtain stable physical properties.

By the prepolymer method, first, a polyol compound and a polyisocyanate compound are reacted to obtain an isocyanate group-containing prepolymer having isocyanate groups at its terminals, and the obtained isocyanate group-containing prepolymer and a chain extender are reacted to obtain a thermoplastic polyurethane (A) having at least one type of structural units derived from the polyol compound, at least one type of structural units derived from the chain extender and at least one type of structural units derived from the polyisocyanate compound.

The amounts of the polyol compound, the polyisocyanate compound and the chain extender used are preferably such that in the total mass (100 mass %) of the thermoplastic polyurethane (A), $([II]+[III])/([I]+[II]+[III])=0.20$ to 0.50, where [I] (mass %) is the proportion of the structural units derived from the polyol compound, [II] (mass %) is the proportion of the structural units derived from the polyisocyanate compound, and [III] (mass %) is the proportion of the structural units derived from the chain extender. The value of the above formula is more preferably from 0.25 to 0.50. The value of the above formula corresponds to the after-mentioned hard segment content.

When the value of the above formula is at least 0.20, the adhesion of the thermoplastic polyurethane (A) will be good, and the melting temperature will not be too low. Further, when the value of the above formula is at most 0.50, the thermoplastic polyurethane (A) is likely to have sufficient flexibility.

Further, the value of $N_{II}/(M_I+M_{III})$, i.e. the isocyanate index (hereinafter sometimes referred to as NCO index) is preferably from 0.80 to 1.05, more preferably from 0.80 to 1.02, further preferably from 0.92 to 0.98, where $M_I$ is the number of moles of hydroxy groups in the polyol compound, $M_{III}$ is the number of moles of functional groups reactive with an isocyanate group in the chain extender, and $N_{II}$ is the number of moles of isocyanate groups in the polyisocyanate compound. When the value of the above formula is at least 0.80, the obtainable thermoplastic polyurethane (A) will have an excellent mechanical strength. Further, when the value of the above formula is at most 1.05, the obtainable thermoplastic polyurethane (A) will have an excellent fluidity under heating.

Here, the number of moles of functional groups reactive with an isocyanate group in the chain extender means the total number of moles of hydroxy groups and primary or secondary amino groups.

When the NCO index of the polyurethane is less than 1, usually the terminal groups of the polyurethane are hydroxy groups of the polyol compound or the functional groups of the chain extender. Accordingly, when a hydroxy group-terminated polyurethane is to be prepared, it is obtained usually by using a compound containing two hydroxy groups such as a dihydric alcohol as the chain extender, and reacting a polyol compound, the chain extender and a polyisocyanate compound under conditions where the NCO index is less than 1. In this case, the NCO index is preferably at least 0.80 and less than 1, more preferably from 0.92 to 0.98.

When the NCO index of the polyurethane exceeds 1, usually the terminal groups of the polyurethane are isocyanate groups. However, due to high reactivity of the isocyanate groups, the isocyanate groups are likely to be reacted with moisture or the like and converted to amino groups or the like, during processing or a relatively long term storage of the polyurethane. By such a change of the terminal groups, a polyurethane having terminal groups other than the hydroxy groups may be used as the thermoplastic polyurethane (A) unless changes occur such that the thermoplasticity is lowered, or the flow initiation temperature is out of the range of from 80 to 150° C. In such a case, the upper limit of the NCO index is preferably 1.05, more preferably 1.02. Further, in some cases, a monofunctional active hydrogen compound may be reacted with the terminal isocyanate group so that the terminal is a residue of the monofunctional active hydrogen compound.

When the NCO index is strictly 1, the molecular weight of the formed polyurethane may be excessive and the flow initiation temperature of the polyurethane may exceed 150° C. However, in reality, it is difficult to adjust the NCO index to be strictly 1, and the molecular weight of the formed polyurethane is hardly excessive, and the thermoplastic polyurethane (A) will be obtained even when the NCO index is 1.

To stably prepare the thermoplastic polyurethane (A) having predetermined physical properties, it is preferred to prepare such a polyurethane by adjusting the NCO index to be less than 1. The thermoplastic polyurethane obtained in such a manner is preferably a hydroxy group-terminated polyurethane. Accordingly, the thermoplastic polyurethane (A) in the present invention is preferably a hydroxy group-terminated polyurethane.

Further, in a case where the thermoplastic polyurethane (A) is prepared by a prepolymer method, when the polyol compound and the polyisocyanate compound are reacted, their blend ratio is adjusted so that the ratio (NCO index) of the number of moles of isocyanate groups in the polyisocyanate compound to the number of moles of hydroxy groups in the polyol compound is higher than 1, that is, the isocyanate groups are in excess, whereby a prepolymer having isocyanate groups at its terminals will be obtained.

For either of the reaction of the polyol compound with the polyisocyanate compound and the reaction of the isocyanate group-containing prepolymer with the chain extender, a known urethane-forming reaction catalyst may be employed.

The urethane-forming reaction catalyst may, for example, be an organic tin compound such as dibutyltin dilaurate, dioctyltin dilaurate, dibutyltin dioctoate or tin 2-ethylhexanoate; an iron compound such as iron acetylacetonate or ferric chloride; or a tertiary amine catalyst such as triethylamine or triethyldiamine. Among them, an organic tin compound is preferred.

The mass average molecular weight (Mw) of the thermoplastic polyurethane (A) is preferably from 30,000 to 200,000, more preferably from 40,000 to 150,000, further preferably from 50,000 to 100,000.

The glass transition temperature (Tg) of the thermoplastic polyurethane (A) is preferably from −40 to 0° C. Tg of the thermoplastic polyurethane (A) may be adjusted e.g. by the content of the hard segment (a moiety derived from the polyisocyanate compound and the chain extender) in the thermoplastic polyurethane (A), or the molecular weight or the type of the polyol compound. For example, in a case where the hard segment content is low, Tg tends to be low. When the hot melt adhesive composition of the present invention contains two or more thermoplastic polyurethanes (A), all the glass transition temperatures (Tg) of these polyurethanes should be within the above preferred range.

The thermoplastic polyurethane (A) has thermoplasticity, and has a flow initiation temperature of from 80 to 150° C. The flow initiation temperature of the thermoplastic polyurethane (A) may be adjusted e.g. by the types of the polyisocyanate compound and the chain extender to be used for preparation of the thermoplastic polyurethane (A), or the NCO index of the polyurethane. For example, in a case where a hydroxy group-terminated polyurethane is to be prepared, the flow initiation temperature tends to be low when the NCO index is low. The more preferred flow initiation temperature of the thermoplastic polyurethane (A) is from 90 to 125° C.

<Phenolic Hydroxy Group-Containing Compound (B)>

The phenolic hydroxy group-containing compound (B) is a compound having a molecular weight of at least 1,000. In a case where the phenolic hydroxy group-containing compound (B) is a compound of a polydisperse system, the mass average molecular weight is employed as the molecular weight of the phenolic hydroxy group-containing compound (B).

The phenolic hydroxy group-containing compound (B) may be a polymer having phenolic hydroxy groups and having a mass average molecular weight of at least 1,000, or may be a compound having phenolic hydroxy groups and having a molecular weight of at least 1,000, not a polymer.

The polymer may be a polymer wherein the aromatic ring of the phenolic framework is present in its main chain or may be a polymer having phenolic hydroxy groups in its side chains.

The phenolic hydroxy group-containing compound (B) may be a phenolic resin (b1) obtained by a reaction of a phenol with an aldehyde; a polymer (b2) of a monomer having an ethylenic double bond and having a phenolic hydroxy group in its side chain; a copolymer (b3) of a monomer having an ethylenic double bond and having a phenolic hydroxy group in its side chain with a monomer having an ethylenic double bond and having no phenolic hydroxy group; tannin (b4); and a compound (b5) having phenolic hydroxy groups and having a molecular weight of at least 1,000, other than the above (b1) to (b4). The phenolic hydroxy group-containing compounds (B) may be used alone or in combination of two or more.

Preferred is at least one member selected from the group consisting of the above (b1) to (b4).

[Phenolic Resin (b1)]

The phenolic resin (b1) is obtained by a reaction of a phenol with an aldehyde.

The phenol may, for example, be phenol; an alkylphenol having from 1 to 4 $C_{1-10}$ alkyl groups as substituents, such as cresol, xylenol, ethylphenol, propylphenol or butylphenol; a polyhydric phenol such as hydroquinone, resorcin or cathechol; a bisphenol such as bisphenol A, bisphenol F or bisphenol S; a trisphenol such as 2,4-bis(4-hydroxybenzyl)-6-methylphenol; a naphthol such as α-naphthol or β-naphthol; or a high molecular weight phenol such as lignin or a hydrolyzate of lignin. Such phenols may be used alone or in combination of two or more.

The aldehyde is preferably formaldehyde.

Particularly preferred is a novolac phenolic resin obtained by condensation of the above phenol and the aldehyde in the presence of an acid catalyst. As the novolac phenol resin, commercial products may suitably be used. For example, PAPS-PN14 and PAPS-PN70, tradenames, manufactured by Asahi Organic Chemicals Industry Co., Ltd. may, for example, be mentioned.

The mass average molecular weight (Mw) of the phenolic resin (b1) is preferably from 1,000 to 15,000, more preferably from 2,000 to 10,000. When this Mw is within a range of from 1,000 to 15,000, the compatibility with the thermoplastic polyurethane (A) will be good, and an effect of improving the adhesion is likely to be obtained.

The softening point of the phenolic resin (b1) is preferably from 70 to 250° C., more preferably from 100 to 200° C., further preferably from 120 to 200° C. When the softening point is at least 70° C., favorable curability of the hot melt adhesive composition is likely to be obtained, and high adhesive strength is likely to be obtained. When the softening point is at most 250° C., favorable hot melt properties of the hot melt adhesive composition are likely to be obtained.

In the phenolic resin (b1), the ratio (number of aromatic rings/number of hydroxy groups) of the number of aromatic rings to the number of hydroxy groups present in the molecule is preferably from 3 to 1, most preferably 1, whereby an effect of improving the adhesion is likely to be obtained.

[Polymer (b2), Copolymer (b3)]

The monomer having an ethylenic double bond and having a phenolic hydroxy group in its side chain, to be used for preparation of the polymer (b2) and the copolymer (b3), may, for example, be vinylphenol or vinyl bromophenol. The polymer (b2) may be a homopolymer of such a monomer having a phenolic hydroxy group in its side chain, or may be a copolymer of two or more of such monomers. The polymer (b2) is preferably polyvinylphenol which is a homopolymer of vinylphenol.

The monomer having no phenolic hydroxy group, to be used for preparation of the copolymer (b3), may, for example, be styrene, methyl methacrylate or 2-hydroxyethyl methacrylate. In the copolymer (b3), the proportion of the structural units having a phenolic hydroxy group is preferably at least 75 mol %, more preferably at least 80 mol %, based on all the structural units. Such a copolymer (b3) is preferably a copolymer of vinylphenol.

The polymer (b2) is superior to the copolymer (b3) in that a favorable effect of improving the adhesion is likely to be obtained, and polyvinylphenol is particularly preferred.

The mass average molecular weight (Mw) of the polymer (b2) and the copolymer (b3) is preferably from 1,000 to 40,000, more preferably from 2,000 to 30,000. When the molecular weight is within a range of from 1,000 to 40,000, the compatibility with the thermoplastic polyurethane (A) will be favorable, and an effect of improving the adhesion is likely to be obtained.

In the polymer (b2) and the copolymer (b3), the preferred ranges of the softening point and the ratio of (number of aromatic rings/number of hydroxy groups) and the reasons are the same as for the phenolic resin (b1).

[Tannin (b4)]

Tannin (b4) is roughly classified into hydrolyzable tannin and condensed tannin, and in the present invention, either may be used so long as it has a molecular weight of at least 1,000. As an example of the hydrolyzable tannin, tannic acid represented by the following formula (I) may be mentioned.

As an example of the condensed tannin, a compound having a molecular weight of at least 1,000, formed by condensation of flavonoid so as to have a high molecular weight, as represented by the following formula (II), may be mentioned. The condensed tannin other than the compound of the formula (II) may be a compound having a molecular weight of at least 1,000, which is epicatechin condensate, epigallocatechin condensate, epicatechin gallate condensate or epigallocatechin gallate condensate.

When the molecular weight of tannin (b4) is at least 1,000, by suppressing the amount of tannin (b4), an effect of improving the adhesion can be obtained while the increase in the glass transition temperature of the composition is suppressed. The upper limit of the molecular weight of tannin (b4) is not particularly limited so long as tannin is available, but is substantially at most 5,000.

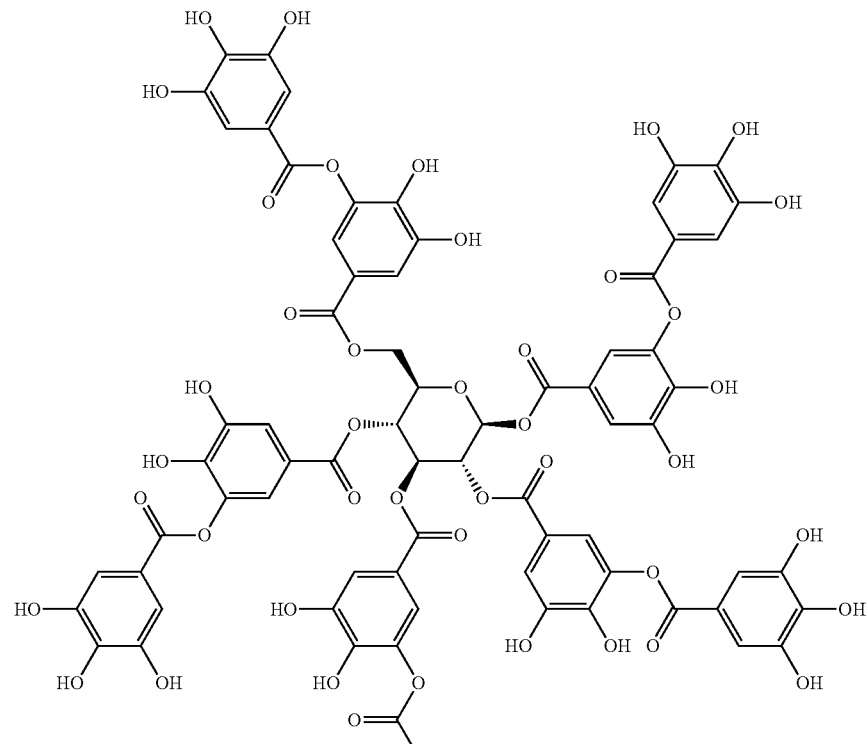

(I)

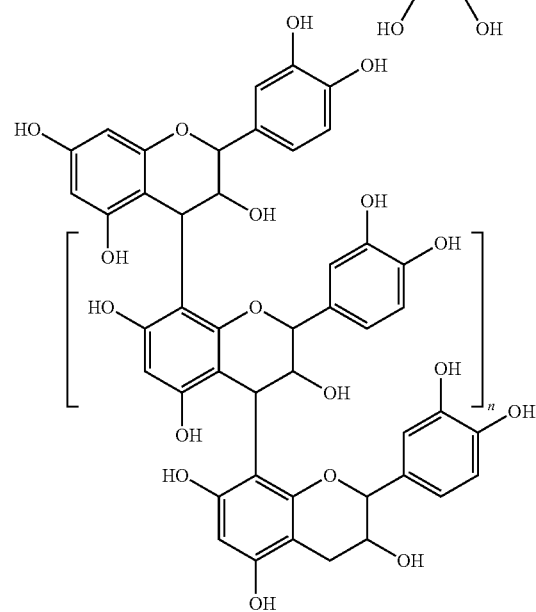

(II)

[Other Compound (b5)]

The compound (b5) having phenolic hydroxy groups and having a molecular weight of at least 1,000, other than the above (b1) to (b4), may be one having a molecular weight of at least 1,000, which is a compound having a structure derived from a tyrosine compound such as polytyrosine; or one having a molecular weight of at least 1,000, which is a compound having a phenol converted to have a high molecular weight by an enzyme reaction.

When the molecular weight of the compound (b5) is at least 1,000, by suppressing the amount of the compound (b5), an effect of improving the adhesion can be obtained while the increase in the glass transition temperature of the composition is suppressed. The upper limit of the molecular weight of the compound (b5) is not particularly limited so long as the compound (b5) is available, but it is preferably at most 40,000.

In the hot melt adhesive composition of the present invention, the content of the phenolic hydroxy group-containing compound (B) is preferably at least 1 part by mass, more preferably at least 2 parts by mass, further preferably at least 5 parts by mass, per 100 parts by mass of the thermoplastic polyurethane (A), whereby a sufficient effect by addition of the phenolic hydroxy group-containing compound (B) is likely to be obtained.

The effect of improving the adhesion by addition of the phenolic hydroxy group-containing compound (B) varies also depending on the molecular weight of the phenolic hydroxy group-containing compound (B), and when the molecular weight is higher, the effect is likely to be obtained with a smaller amount.

On the other hand, if the content of the phenolic hydroxy group-containing compound (B) is too high, the hot melt adhesive composition tends to be hard, and the adhesive strength may rather be lowered. This is considered to be the influence of the aromatic ring of the phenolic hydroxy group-containing compound (B). Accordingly, although the upper limit of the content of the phenolic hydroxy group-containing compound (B) depends on the type of the phenolic hydroxy group-containing compound (B), it is preferably at most 100 parts by mass, more preferably at most 70 parts by mass per 100 parts by mass of the thermoplastic polyurethane (A) for example. Further, in order to achieve a favorable adhesive strength, the upper limit of the content of the phenolic hydroxy group-containing compound (B) is preferably 50 parts by mass, more preferably 30 mass %.

<Additives>

The hot melt adhesive composition of the present invention may optionally contain additives known for the polyurethane type hot melt adhesive composition, in addition to the thermoplastic polyurethane (A) and the phenolic hydroxy group-containing compound (B).

The additives may, for example, be a stabilizer such as an antioxidant, an ultraviolet absorber or a light stabilizer; or a plasticizer.

The amount of the stabilizer is preferably from 0.1 to 5 parts by mass per 100 parts by mass of the hot melt adhesive composition.

The amount of the plasticizer is preferably from 0 to 20 parts by mass per 100 parts by mass of the hot melt adhesive composition. When the amount of the plasticizer is at most 20 parts by mass, a decrease in the adhesive strength due to bleeding of the plasticizer is likely to be suppressed.

<Hot Melt Adhesive Composition>

The adhesive composition of the present invention is solid at room temperature and is melted by heating at the time of its use. For example, it is in the form of e.g. a film, pellets or flakes before its use, and at the time of its use, such a composition is placed on the bonding portion of an adherend (substrate), heated and melted. Otherwise, by using an applicator for a hot melt adhesive, a preliminarily melted composition is applied to an adherend (substrate). As another method, the adhesive composition of the present invention in the form of pellets or flakes is bonded to an adherend (substrate) while it is formed into a film by an extruder.

Adherends (substrates) are bonded in a state where the adhesive composition is heated and melted, and then the composition is cooled, whereupon the adhesive composition is solidified and the adherends (substrates) are fixed.

The adhesive composition of the present invention is useful for clothing, such as bonding of fiber products.

In a case where the adherend (substrate) is a fiber product, if the adhesive layer is too thick, the flexibility of the fabric at the bonding portion tends to be impaired, whereby the hand feeling tends to be hard, and the drape of the bonded product is poor in some cases. Accordingly, when the adhesive composition is used for bonding of a fiber product, the thickness of the adhesive layer when applied to the substrate is preferably from 50 to 250 µm.

The hot melt adhesive composition of the present invention comprises the thermoplastic polyurethane (A) as a resin component and accordingly has mechanical properties preferred for clothing, such that the elongation at break after curing is large, and the modulus is low, whereby the drape is good.

As shown in the after-mentioned Examples, the hot melt adhesive composition of the present invention comprising the thermoplastic polyurethane (A) and the phenolic hydroxy group-containing compound (B) has a remarkably improved adhesive strength to nylon cloth as compared with adhesive compositions in Comparative Examples which contain no phenolic hydroxy group-containing compound (B). Since the nylon cloth is an adherend (substrate) to which bonding is particularly difficult, the adhesive composition of the present invention is estimated to have an adhesive strength equal to or higher than to the nylon cloth, even to substrates of other materials.

Further, it has a favorable adhesive strength under bonding conditions of low temperature and short time, has a high peel strength in a wide temperature range of from room temperature to low temperature, and has a favorable adhesive strength.

The reason of such effects is considered as follows. A high molecular weight of the phenolic hydroxy group-containing compound (B) and good affinity between the thermoplastic polyurethane (A) and the phenolic hydroxy group-containing compound (B), the participation of phenolic hydroxy groups in the phenolic hydroxy group-containing compound (B) in the chemical bond with nylon, and moderately high polarity and cohesive force of the phenolic hydroxy group-containing compound (B), contribute to the effect of improving the adhesion.

For example, as an index of the polarity, a SP value (solubility parameter) may be mentioned. In the present invention, the SP value of the phenolic hydroxy group-containing compound (B) is considered to be around the middle of the SP value of the thermoplastic polyurethane (A) and the SP value of the material of the adherend (substrate), and by such a SP value, a favorable effect of improving the adhesion by addition of the phenolic hydroxy group-containing compound (B) is achieved in the hot melt adhesive composition of the present invention.

Here, the SP value is the one-half power of the cohesive energy density i.e. the evaporation energy per unit volume of one molecule, and is a value indicating the polarity per unit volume. The SP value can be calculated by Fedros method (see the literature: R. F. Fedros, Polym. Eng. Sci., 14[2]147 (1974)).

EXAMPLES

Now, the present invention will be described in detail with reference to Examples and Comparative Examples. However, it should be understood that the present invention is by no means restricted to such specific Examples. Further, in the following, "parts" means "parts by mass".

A hydroxy group-terminated polyurethane as the thermoplastic polyurethane (A) was prepared in a blend ratio as identified in Table 1. In Table 1, abbreviations have the following meanings.

Further, in Table 1, the NCO index when a prepolymer was prepared (the NCO index of the polymer) and the NCO index when a polyurethane was prepared from the prepolymer (the NCO index of the polyurethane) are also shown.

(Polyol)

PBEA1000: Polybutylene ethylene adipate having a molecular weight of 1,000 (manufactured by Nippon Polyurethane Industry Co., Ltd., tradename: NIPPOLLAN 141, hydroxy value: 111.0 mgKOH/g, acid value: 0.6 mgKOH/g).

PTMG1000: Polyoxytetramethylene glycol having a molecular weight of 1,000 (manufactured by Hodogaya Chemical Co., Ltd., tradename: PTG-1000SN, hydroxy value: 112.0 mgKOH/g).

PBA2000: Polybutylene adipate having a molecular weight of 2000 (manufactured by Nippon Polyurethane Industry Co., Ltd., tradename: N-4010, hydroxy value: 55.7 mgKOH/g, acid value: 0.7 mgKOH/g).

PBA1000: Polybutylene adipate having a molecular weight of 1000 (manufactured by Nippon Polyurethane Industry Co., Ltd., tradename N-4009. Hydroxy value: 112.0 mgKOH/g, acid value: 0.4 mgKOH/g).

(Polyisocyanate Compound)

MDI-1: 4,4'-Diphenylmethane diisocyanate (manufactured by Nippon Polyurethane Industry Co., Ltd., tradename: MILLIONATE MT, molecular weight: 250).

MDI-2: 50:50 mixture (weight ratio) of 2,4'-diphenylmethane diisocyanate and 4,4'-diphenylmethane diisocyanate (manufactured by BASF INOAC Polyurethanes Ltd., tradename: Lupranate MI, molecular weight: 250).

(Chain Extender)

1,4-BD: 1,4-Butandiol (manufactured by JUNSEI CHEMICAL CO., LTD., reagent, molecular weight: 90).

1,6-HD: 1,6-Hexanediol (manufactured by JUNSEI CHEMICAL CO., LTD., reagent, molecular weight: 118.18).

3-MPD: 3-Methyl-1,5-pentanediol (manufactured by JUNSEI CHEMICAL CO., LTD., reagent, molecular weight: 118.20).

Preparation Example 1

To a four-necked flask equipped with a stirrer, a reflux condenser, a nitrogen-introducing tube, a thermometer and a dropping funnel, 100 parts of PBEA1000 and 45 parts of MDI-1 as the diisocyanate compound were charged and gradually heated to 80° C. to carry out a prepolymer preparation reaction for 4 hours. After the reaction, a part of the content was taken out, and the Isocyanate group content (hereinafter referred to as NCO group content) was measured. The reaction was completed upon confirmation of the measured NCO group content being at most the theoretically calculated content, and an isocyanate group-containing urethane prepolymer was obtained.

Then, 8.7 parts of 1,4-BD as the chain extender was charged into the four-necked flask, and the prepolymer and 1,4-BD were stirred (10 minutes) at a stirring rate of 300 rpm. The solution after mixing was poured into a mold having a thickness of about 5 mm and heat-cured at 130° C. for 4 hours to carry out the chain extending reaction thereby to obtain a block-form hydroxy group-terminated polyurethane.

Then, the block-form hydroxy group-terminated polyurethane was pulverized by a pulverizer (manufactured by HORAI Co., Ltd., tradename: HORAI UM-360) to obtain a hydroxy group-terminated polyurethane (A1) in the form of flakes.

Of the obtained hydroxy group-terminated polyurethane (A1), the glass transition temperature, the flow initiation temperature and the mass average molecular weight (Mw) were measured. The results are shown in Table 1.

Preparation examples 2 to 5

Hydroxy group-terminated polyurethanes (A2) to (A5) in the form of flakes were obtained in the same manner as in Preparation Example 1 except that the blend ratio was changed as identified in Table 1.

Of the obtained hydroxy group-terminated polyurethanes (A2) to (A5), the glass transition temperature, the flow initiation temperature and the mass average molecular weight (Mw) were measured. The results are shown in Table 1.

The glass transition temperature of the hydroxy group-terminated polyurethane was measured by the following method.

The hydroxy group-terminated polyurethane (A1) to (A5) was subjected to pressure molding at 160° C. by using a mold having a thickness of 150 μm to obtain a film-form sample. Then, the obtained film (thickness: 100 μm) was cut into a rectangle having a length of 20 mm and a width of 10 mm to prepare an evaluation sample.

Of the evaluation sample, the dissipation factor was measured by a dynamic viscoelasticity measuring apparatus (manufactured by Seiko Instrumental Inc., tradename; EXSTAR DMS6100) in a tensile mode at from −50 to 80° C. at a frequency of 10 Hz. The temperature at which the dissipation factor became maximum was regarded as the glass transition temperature.

The flow initiation temperature of the hydroxy group-terminated polyurethane was measured by the following method.

With respect to the hydroxy group-terminated polyurethanes (A1 to A5), the flow initiation temperature was measured by using a Koka type flow tester (manufactured by Shimadzu Corporation, tradename: CFT-500D) under measurement conditions of a die diameter of 1 mm, a die length of 10 mm, a load of 30 kg, preheating of 5 minutes, a temperature raise starting temperature of 80° C. and a heating rate of 3° C./min. The procedure of the thermoplastic polyurethane from solid to the flow region via the rubber-like elastic region was continuously measured, and the temperature at which the thermoplastic polyurethane started flowing out of the die was regarded as the flow initiation temperature.

The mass average molecular weight (Mw) of the hydroxy group-terminated polyurethane was measured by the following method.

It is a molecular weight as calculated as polystyrene, obtained by measurement by gel permeation chromatography (GPC) under the following conditions using a calibration curve prepared by using a standard polystyrene sample having a known molecular weight.

(GPC Measurement Conditions)

Machine used: HLC-8220GPC (manufactured by TOSOH CORPORATION)

Data processing apparatus: SC-8020 (manufactured by TOSOH CORPORATION)

Column used: TSKgel Super HZ2500 (manufactured by TOSOH CORPORATION) and TSKgel Super HZ40 (manufactured by TOSOH CORPORATION) connected (manufactured by TOSOH CORPORATION)

Column temperature: 40° C., detector: RI, solvent: tetrahydrofuran, flow rate: 0.35 ml/min, sample concentration: 0.50%, amount of injection: 20 μl.

Standard sample for preparation of calibration curve: Polystyrene (manufactured by Polymer Laboratories, [EasiCal] PS-2 [Polystyrene Standards])

B5: Polyvinylphenol, manufactured by Maruzen Petrochemical Co., Ltd., tradename: MARUKA LYNCUR H-2P, mass average molecular weight: 23,900, molecular weight distribution: 4.1, softening point: at least 200° C. and at most 250° C.

B6: Polyvinylphenol, manufactured by Maruzen Petrochemical Co., Ltd., tradename: MARUKA LYNCUR CST70, mass average molecular weight: 4,000, molecular weight distribution: 1.7, softening point: 145° C.

B7: Tunnic acid (compound represented by the above formula (I)), reagent by Wako Pure Chemical Industries, Ltd., mass average molecular weight (measured value): 1,600, molecular weight distribution: 1.2, CAS number 1401-55-4.

TABLE 1

|  |  | Preparation Example 1 | Preparation Example 2 | Preparation Example 4 | Preparation Example 4 | Preparation Example 5 |
|---|---|---|---|---|---|---|
| Polyol | PBEA1000 | 100 |  | 30 |  |  |
|  | PTMG1000 |  | 100 |  |  |  |
|  | PBA2000 |  |  | 70 |  |  |
|  | PBA1000 |  |  |  | 100 | 100 |
| Polyisocyanate | MDI-1 | 50 | 47 | 34 | 50 | 23 |
| compound | MDI-2 |  |  |  |  | 23 |
| NCO index of prepolymer |  | 2.0 | 2.0 | 2.1 | 2.0 | 1.8 |
| Chain extender | 1,4-BD | 9.8 |  | 6.9 | 8 | 7.6 |
|  | 1,6-HD |  | 11.4 |  |  |  |
|  | 3-MPD |  |  |  | 2.6 |  |
| NOC index of polyurethane |  | 0.96 | 0.96 | 0.92 | 0.95 | 0.92 |
| Thermoplastic polyurethane (A) |  | A1 | A2 | A3 | A4 | A5 |
| Glass transition temperature (Tg) | Unit: ° C. | −11 | −26 | −40 | −17 | −7 |
| Flow initiation temperature | Unit: ° C. | 110 | 103 | 117 | 101 | 98 |
| Mass average molecular weight (Mw) | — | 50000 | 60500 | 61000 | 62000 | 73500 |

Hot melt adhesive compositions were produced in blend ratios as identified in Tables 2-1, 2-2 and 3. The phenolic hydroxy group-containing compounds (B) in Tables 2-1, 2-2 and 3 are as follows.

(Phenolic Hydroxy Group-Containing Compound)

B1: Novolac phenolic resin, manufactured by Asahi Organic Chemicals Industry Co., Ltd., tradename: PAPS-PN14, mass average molecular weight: 3,600, molecular weight distribution: 2.6, softening point: 134° C.

B2: Novolac phenolic resin, manufactured by Asahi Organic Chemicals Industry Co., Ltd., tradename: PAPS-PN70, mass average molecular weight: 8,800, molecular weight distribution: 3.8, softening point: 155° C.

B3: Polyvinylphenol, manufactured by Maruzen Petrochemical Co., Ltd., tradename: MARUKA LYNCUR S-2P, mass average molecular weight: 5,400, molecular weight distribution: 1.7, softening point: 190° C.

B4: Polyvinylphenol, manufactured by Maruzen Petrochemical Co., Ltd., tradename: MARUKA LYNCUR S-4P, mass average molecular weight: 11,200, molecular weight distribution: 2.0, softening point: 200° C.

Example 1

100 Parts of the hydroxy group-containing polyurethane (A1) in the form of flakes obtained in Preparation Example 1 and 11 parts of the phenolic hydroxy group-containing compound (B1) were weighed and melt-kneaded by using a single screw extruder (manufactured by TANABE PLASTICS MACHINERY CO., LTD., tradename: VS30-24) to obtain a hot melt adhesive composition (HA1). Then, using a mold having a thickness of 150 μm, pressure molding was carried out at 160° C. to obtain a film-form hot melt adhesive (F1).

Examples 2 to 17 and Comparative Examples 1 to 5

In the same manner as in Example 1 except that the types and the amounts of the polyurethanes and the phenolic hydroxy group-containing compounds were changed as identified in the following Tables 2-1, 2-2 and 3, hot melt adhesive compositions (HA2) to (HA22) were prepared, and film-form hot melt adhesives (F2) to (F22) were obtained by using the compositions.

TABLE 2-1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Thermoplastic polyurethane (A) | A1 | 100 | 100 | 100 | 100 |  |  | 100 | 100 | 100 |
|  | A2 |  |  |  |  | 100 |  |  |  |  |
|  | A3 |  |  |  |  |  | 100 |  |  |  |

TABLE 2-1-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Phenolic hydroxy group-containing compound (B) | A4 | | | | | | | | | |
| | A5 | | | | | | | | | |
| | B1 | 11 | 18 | | | | | | | |
| | B2 | | | 11 | 18 | 18 | 18 | | | |
| | B3 | | | | | | | 5 | 11 | 18 |
| | B4 | | | | | | | | | |
| | B5 | | | | | | | | | |
| | B6 | | | | | | | | | |
| | B7 | | | | | | | | | |
| Hot melt adhesive composition | | HA1 | HA2 | HA3 | HA4 | HA5 | HA6 | HA7 | HA8 | HA9 |

TABLE 2-2

|  |  | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Thermoplastic polyurethane (A) | A1 | 100 | 100 | | | 100 | 100 | | 100 |
| | A2 | | | | | | | | |
| | A3 | | | 100 | 100 | | | | |
| | A4 | | | | | | | | |
| | A5 | | | | | | | 100 | |
| Phenolic hydroxy group-containing compound (B) | B1 | | | | | | | | |
| | B2 | | | | | | | 18 | 43 |
| | B3 | | | 5 | 11 | | | | |
| | B4 | 5 | | | | | | | |
| | B5 | | 2 | | | | | | |
| | B6 | | | | | 18 | | | |
| | B7 | | | | | | 18 | | |
| Hot melt adhesive composition | | HA10 | HA11 | HA12 | HA13 | HA14 | HA15 | HA16 | HA17 |

TABLE 3

|  |  | Comp. Ex. 1 | Comp. Ex. 2 | Comp. Ex. 3 | Comp. Ex. 4 | Comp. Ex. 5 |
|---|---|---|---|---|---|---|
| Thermoplastic polyurethane (A) | A1 | 100 | | | | |
| | A2 | | 100 | | | |
| | A3 | | | 100 | | |
| | A4 | | | | 100 | |
| | A5 | | | | | 100 |
| Phenolic hydroxy group-containing compound (B) | B1 | | | | | |
| | B2 | | | | | |
| | B3 | | | | | |
| | B4 | | | | | |
| | B5 | | | | | |
| | B6 | | | | | |
| | B7 | | | | | |
| Hot melt adhesive composition | | HA18 | HA19 | HA20 | HA21 | HA22 |

Of the hot melt adhesive compositions, the flow initiation temperature and the melt flow rate (MFR) were measured by the following methods. The results are shown in the following Tables 4-1, 4-2 and 5. MFR in Example 14 could not be measured.

Further, with respect to the obtained film-form hot melt adhesives, the following tests were conducted. The evaluation results are shown in Tables 4-1, 4-2, 4-3 and 5.

[Flow Initiation Temperature]

With respect to the hot melt adhesives (HA1 to HA22), the flow initiation temperature was measured by using a Koka type flow tester (manufactured by Shimadzu Corporation, tradename: CFT-500D) under measurement conditions of a die diameter of 1 mm, a die length of 10 mm, a load of 30 kg, preheating of 5 minutes, a temperature raise starting temperature of 80° C., and a heating rate of 3° C./min. The procedure of the hot melt adhesive from solid to the flow region via the rubber-like elastic region was continuously measured, and the temperature at which the hot melt adhesive started flowing out of the die was regarded as the flow initiation temperature.

[Melt Flow Rate (MFR)]

With respect to the hot melt adhesives (HA1 to HA22), MFR (g/10 min) was measured by using a Koka type flow tester (manufactured by Shimadzu Corporation, tradename: CFT-500D). The measurement conditions were such that the die diameter was 1 mm, the die length was 1 mm, the load was 30 kg, the preheating was 5 minutes, and the measurement temperature was 160° C.

[Mechanical Properties]

Of the film-form hot melt adhesives (F1 to F22), in accordance with JIS K7311, the 100% modulus (unit: MPa), the 300% modulus (unit: MPa), the tensile strength at break (unit: MPa) and the elongation (unit: %) were measured by using a tensilon (manufactured by A&D Company, Limited, tradename: RTG-1310) at a tensile speed of 300 mm/min.

[Test of Adhesion to Nylon Taffeta]

Each of the film-form hot melt adhesives (F1 to F22) was sandwiched between two sheets of nylon taffeta (manufactured by Unitika Fiber Co., Ltd., product No.: QKT-713, No. 70 plain woven) and by using a heat gradient tester (manufactured by Toyo Seiki Seisaku-sho, Ltd., tradename: Heat Gradient Tester), while a pressure of 0.5 MPa was exerted, it was heated at a melting temperature of 160° C. or 170° C. for 20 seconds by contacting a hot plate of 2.5 cm×2.5 cm. The obtained laminate was cut into a width of 15 mm, and the peel strength (unit: N/15 mm) was measured by using a tensilon (the same as mentioned above) and a thermostat for tensilon (manufactured by A&D Company, Limited, tradename: TLF-R3T) under conditions of 23° C. or −20° C. at a peeling speed of 200 mm/min.

TABLE 4-1

|  | unit | Ex. 1 | Ex. 2 | Ex. 3 | Ex. 4 | Ex. 5 | Ex. 6 |
|---|---|---|---|---|---|---|---|
| Hot melt adhesive composition |  | HA1 | HA2 | HA3 | HA4 | HA5 | HA6 |
| Flow initiation temperature | °C. | 111 | 106 | 110 | 111 | 102 | 100 |
| MFR | g/10 min | 18.5 | 23.7 | 17.2 | 16.7 | 10.0 | 62.6 |
| Film-form hot melt adhesive |  | F1 | F2 | F3 | F4 | F5 | F6 |
| Mechanical properties |  |  |  |  |  |  |  |
| 100% modulus | MPa | 3.7 | 5.2 | 5.2 | 4.8 | 3.8 | 3.3 |
| 300% modulus | MPa | 4.9 | 7.9 | 7.5 | 8.8 | 5.7 | 4.4 |
| Tensile strength at break | MPa | 11.7 | 14.6 | 13.9 | 17.5 | 13.1 | 8.5 |
| Elongation at break | % | 890 | 650 | 560 | 460 | 690 | 720 |
| Adhesive strength to nylon taffeta |  |  |  |  |  |  |  |
| Bonding conditions: 160° C. for 20 seconds |  |  |  |  |  |  |  |
| Peel temperature: +23° C. | N/15 mm | 21.7 | 24.8 | 57.1 | 56.9 | 42.4 | 40.5 |
| Peel temperature: −20° C. | N/15 mm | 6.9 | 6.3 | 19.6 | 11.2 | 21.0 | 36.1 |
| Bonding conditions: 170° C. for 20 seconds |  |  |  |  |  |  |  |
| Peel temperature: +23° C. | N/15 mm | 40.8 | 32.7 | 61.2 | 62.8 | 51.6 | 42.6 |
| Peel temperature: −20° C. | N/15 mm | 8.2 | 13.7 | 28.5 | 14.3 | 33.5 | 52.3 |

TABLE 4-2

|  | unit | Ex. 7 | Ex. 8 | Ex. 9 | Ex. 10 | Ex. 11 | Ex. 12 |
|---|---|---|---|---|---|---|---|
| Hot melt adhesive composition |  | HA7 | HA8 | HA9 | HA10 | HA11 | HA12 |
| Flow initiation temperature | °C. | 111 | 111 | 110 | 110 | 110 | 101 |
| MFR | g/10 min | 14.3 | 19.8 | 22.7 | 17.9 | 18.2 | 61.6 |
| Film-form hot melt adhesive |  | F7 | F8 | F9 | F10 | F11 | F12 |
| Mechanical properties |  |  |  |  |  |  |  |
| 100% modulus | MPa | 4.8 | 4.6 | 4.8 | 4.8 | 4.7 | 3.1 |
| 300% modulus | MPa | 6.4 | 6.8 | 6.8 | 6.2 | 6.1 | 4.9 |
| Tensile strength at break | MPa | 14.8 | 15.4 | 14.2 | 9.4 | 8.5 | 11.8 |
| Elongation at break | % | 830 | 720 | 640 | 570 | 570 | 750 |
| Adhesive strength to nylon taffeta |  |  |  |  |  |  |  |
| Bonding conditions: 160° C. for 20 seconds |  |  |  |  |  |  |  |
| Peel temperature: +23° C. | N/15 mm | 26.8 | 19.1 | 32.0 | 57.6 | 26.7 | 26.8 |
| Peel temperature: −20° C. | N/15 mm | 5.8 | 5.8 | 9.8 | 8.7 | 6.1 | 23.7 |
| Bonding conditions: 170° C. for 20 seconds |  |  |  |  |  |  |  |
| Peel temperature: +23° C. | N/15 mm | 29.0 | 49.2 | 30.4 | 53.2 | 34.5 | 29.6 |
| Peel temperature: −20° C. | N/15 mm | 10.6 | 11.0 | 12.7 | 7.7 | 12.6 | 22.4 |

TABLE 4-3

|  | unit | Ex. 13 | Ex. 14 | Ex. 15 | Ex. 16 | Ex. 17 |
|---|---|---|---|---|---|---|
| Hot melt adhesive composition |  | HA13 | HA14 | HA15 | HA16 | HA17 |
| Flow initiation temperature | °C. | 95 | 100 | 106 | 100 | 89 |
| MFR | g/10 min | 62.8 | Unmeasurable | 29.6 | 3.6 | 14.1 |
| Film-form hot melt adhesive |  | F13 | F14 | F15 | F16 | F17 |
| Mechanical properties |  |  |  |  |  |  |
| 100% modulus | MPa | 3.0 | 4.8 | 4.5 | 2.1 | 11.7 |
| 300% modulus | MPa | 4.6 | 6.7 | 6.0 | 3.3 | 23.5 |
| Tensile strength at break | MPa | 11.1 | 10.7 | 8.4 | 51.6 | 25.6 |
| Elongation at break | % | 830 | 560 | 570 | 580 | 350 |
| Adhesive strength to nylon taffeta |  |  |  |  |  |  |
| Bonding conditions: 160° C. for 20 seconds |  |  |  |  |  |  |
| Peel temperature: +23° C. | N/15 mm | 31.8 | 8.2 | 9.7 | 39.0 | 1.8 |
| Peel temperature: −20° C. | N/15 mm | 11.1 | 4.3 | 10.4 | 10.6 | 2.0 |
| Bonding conditions: 170° C. for 20 seconds |  |  |  |  |  |  |
| Peel temperature: +23° C. | N/15 mm | 41.0 | 12.8 | 19.4 | material failure | material failure |
| Peel temperature: −20° C. | N/15 mm | 37.2 | 6.2 | 11.2 | 12.1 | 11.8 |

TABLE 5

|  | unit | Comp Ex. 1 | Comp Ex. 2 | Comp Ex. 3 | Comp Ex. 4 | Comp Ex. 5 |
|---|---|---|---|---|---|---|
| Hot melt adhesive composition |  | HA18 | HA19 | HA20 | HA21 | HA22 |
| Flow initiation temperature | °C. | 110 | 117 | 103 | 101 | 98 |
| MFR | g/10 min | 17.9 | 12.0 | 50.9 | 19.8 | 3.1 |
| Film-form hot melt adhesive |  | F18 | F19 | F20 | F21 | F22 |
| Mechanical properties |  |  |  |  |  |  |
| 100% modulus | MPa | 5.0 | 4.1 | 4.5 | 5.1 | 3.2 |
| 300% modulus | MPa | 6.2 | 5.5 | 6.2 | 7.4 | 5.1 |
| Tensile strength at break | MPa | 13.8 | 11.2 | 12.7 | 14.5 | 49.8 |
| Elongation at break | % | 890 | 900 | 780 | 580 | 710 |
| Adhesive strength to nylon taffeta |  |  |  |  |  |  |
| Bonding conditions: 160° C. for 20 seconds |  |  |  |  |  |  |
| Peel temperature: +23° C. | N/15 mm | 5.3 | 6.7 | 5.2 | 5.1 | 5.4 |
| Peel temperature: −20° C. | N/15 mm | 4.5 | 9.0 | 4.8 | 4.4 | 3.8 |
| Bonding conditions: 170° C. for 20 seconds |  |  |  |  |  |  |
| Peel temperature: +23° C. | N/15 mm |  | 7.3 | 5.9 | 5.6 | 5.2 |
| Peel temperature: −20° C. | N/15 mm | 4.3 | 8.8 | 5.1 | 4.3 | 3.9 |

As evident from the results shown in Tables 4-1, 4-2, 4-3 and 5, the hot melt adhesive compositions obtained in Examples 1 to 17 have a favorable low modulus and a favorable elongation in a state where they are cured in the film form, and they do not impair the drape when used as an adhesive for clothing.

Further, with respect to the adhesive to nylon taffeta, in the case of melt bonding at a melting temperature of 170° C. for 20 seconds, both peel strength at 23° C. and peel strength at −20° C. are high, and sufficient adhesive strength is obtained. Further, a sufficient adhesive strength was obtained even when the melting temperature was lowered to 160° C. In Examples 16 and 17, when melt bonding at a melting temperature of 170° C. for 20 seconds was carried out and then peeling at 23° C. was carried out, the cloth was broken (material failure).

INDUSTRIAL APPLICABILITY

The present invention relates to a hot melt adhesive, having properties suitable as a hot melt adhesive to be used for bonding of cloth such as nylon cloth having a particularly low heat distortion temperature.

This application is a continuation of PCT Application No. PCT/JP2010/064522, filed Aug. 26, 2010, which is based upon and claims the benefit of priority from Japanese Patent Application No. 2009-196846 filed on Aug. 27, 2009. The contents of those applications are incorporated herein by reference in its entirety.

What is claimed is:

1. A hot melt adhesive composition comprising:
   a thermoplastic polyurethane (A) having a flow initiation temperature of from 80 to 150° C.; and
   a phenolic hydroxy group-containing compound (B) having phenolic hydroxy groups and having a molecular weight of at least 1,000,
   wherein the phenolic hydroxy group-containing compound (B) is one of: a phenolic resin which is obtained by a reaction of a phenol with an aldehyde and has a mass average molecular weight of from 3,600 to 15,000; and hydrolysable tannin or condensed tannin, which has a molecular weight of at least 1,000, and
   the thermoplastic polyurethane (A) has structural units derived from at least one polyol compound selected from the group consisting of a polyester polyol, a polyether polyol and a polyester ether polyol, structural units derived from at least one chain extender selected from the group consisting of 1,4-butanediol, 1,5-pentanediol and 1,6-hexanediol, and structural units derived from at least one polyisocyanate compound,
   wherein structural units derived from chain extenders in the thermoplastic polyurethane (A) consist of the structural units derived from the at least one chain extender selected from the group consisting of 1,4-butanediol, 1,5-pentanediol and 1,6-hexanediol.

2. The hot melt adhesive composition according to claim 1, wherein the phenolic hydroxy group-containing compound (B) is included in an amount of from 1 to 100 parts by mass per 100 parts by mass of the thermoplastic polyurethane (A).

3. The hot melt adhesive composition according to claim 1, wherein the phenolic hydroxy group-containing compound (B) is included in an amount of from 1 to 50 parts by mass per 100 parts by mass of the thermoplastic polyurethane (A).

4. The hot melt adhesive composition according to claim 1, wherein the mass average molecular weight of the thermoplastic polyurethane (A) is from 40,000 to 150,000.

5. The hot melt adhesive composition according to claim 1, wherein the thermoplastic polyurethane (A) has a glass transition temperature of from −40 to 0° C.

6. The hot melt adhesive composition according to claim 1, wherein the thermoplastic polyurethane (A) is a hydroxy group-terminated polyurethane.

7. The hot melt adhesive composition according to claim 1, wherein the polyol compound is a diol compound having a hydroxy value, in mg KOH/g, of from 22 to 230, the chain extender is a dihydric alcohol having a molecular weight of at most 300, and the polyisocyanate compound is a diisocyanate compound.

8. The hot melt adhesive composition according to claim 7, wherein the thermoplastic polyurethane (A) is a hydroxy group-terminated polyurethane obtained by reacting the diol compound having a hydroxy value, in mg KOH/g, of from 22 to 230, the dihydric alcohol having a molecular weight of at most 300 and the diisocyanate compound in a ratio such that the isocyanate index becomes from 0.92 to 0.98.

9. The hot melt adhesive composition according to claim 1, wherein the phenolic hydroxy group-containing compound (B) is at least one member selected from the group consisting of a phenolic resin obtained by a reaction of a phenol with an aldehyde; a polymer of a monomer having an ethylenic double bond and having a phenolic hydroxy group in its side chain; a copolymer of a monomer having an ethylenic double bond and having a phenolic hydroxy group in its side chain with a monomer having an ethylenic double bond and having no phenolic hydroxy group; and tannin, and
   in the copolymer, a proportion of structural units having a phenolic hydroxy group is at least 75 mol % based on all structural units of the copolymer.

10. The hot melt adhesive composition according to claim 1, wherein the hot melt adhesive is adhesive to nylon.

11. The hot melt adhesive composition according to claim 1, wherein the thermoplastic polyurethane (A) has a structural unit derived from a polyester polyol, and the polyester polyol is a polyester diol obtained by subjecting a $C_{2-12}$ alkylene diol and an aliphatic dicarboxylic acid to condensation reaction.

12. The hot melt adhesive composition according to claim 1, wherein the phenolic hydroxy group-containing compound (B) is one of a phenolic resin having a mass average molecular weight of 3,600 and a phenolic resin having a mass average molecular weight of 8,800.

13. The hot melt adhesive composition according to claim 1, wherein the phenolic hydroxy group-containing compound (B) is a phenolic resin having a softening point of from 120 to 200° C.

14. The hot melt adhesive composition according to claim 1, wherein the thermoplastic polyurethane (A) consists of the structural units derived from the at least one polyol compound selected from the group consisting of a polyester polyol, a polyether polyol and a polyester ether polyol, the structural units derived from the at least one chain extender selected from the group consisting of 1,4-butanediol, 1,5-pentanediol and 1,6-hexanediol, and the structural units derived from the at least one polyisocyanate compound.

* * * * *